UNITED STATES PATENT OFFICE.

ERNST SIMONS, OF CASSEL, GERMANY.

METHOD OF PREPARING GRAINS FOR THE MANUFACTURE OF FLOUR.

1,178,459.      Specification of Letters Patent.      Patented Apr. 4, 1916.

No Drawing.      Application filed November 10, 1913. Serial No. 800,225.

*To all whom it may concern:*

Be it known that I, ERNST SIMONS, a subject of the German Emperor, and a resident of Cassel, Germany, have invented a new and useful Method of Preparing Grains for the Manufacture of Flour, of which the following is a specification.

Some field products as, for instance, grains, have been disintegrated by treating them with water or steam of a temperature 100 degrees C. but this resulted not only in destroying the gluten, but also in rendering the diastase inactive. To preserve the latter, the grains might be treated with water of a temperature of less than 100 degrees C., for instance 85 degrees C., but then valuable properties of said products, especially in the case of grains, *i. e.* the aromatic cerealic scents, would be lost, although they ought to be preserved. These scents would, in fact, become lost partly by way of scum and slime, forming upon the mixture of the water and grains and being removed in proper time, partly in and by the liquid, which cannot be completely made use of. The drawbacks in question are fully obviated by employing steam of less than 100 degrees C., for instance 85 degrees C., this of course, must be done in a vacuum receptacle in which the pressure inherent with said temperature is kept uniform. To accelerate the process, substances adapted to act upon the cellulose of the husks or hulls and to soften or mollify the same may be employed in combination with the application of steam of reduced pressure. Besides the advantages already disclosed, my improved and novel method excels the previous method also in the following points: (1) The germinative faculty is preserved; (2) the gluten is not destroyed; and (3) the aromatic cerealic scents are preserved also. It might be assumed that the scum and slime formed also under the partial vacuum also contain valuable nutritive salts, but this is, in fact, not the case. Suppose, the grains are treated for at least 5 hours with steam of 85 degrees C. under a partial vacuum at a pressure of 436.5 millimeters, the scum and slime being removed in proper time, the grains will then become so soft that they may be squashed without any difficulty. After a digestion of two hours at 55 degrees C. a solution is obtained which strongly reduces Fehling's solution and deviates the polarized ray of light to the right. Accordingly the diastase is obtained. The thus prepared grains are dried in known manner and are then reduced to flour. During the drying the temperature employed may be raised to some extent but not so far as to produce noxious effects. If desired or preferred, oxygen may be admitted at the same time to improve the product.

The flour produced from the grains treated in the before-described manner does not contain any bitter substances and may be used for feeding or baking purposes either alone or in combination with other kinds of flour. It has a fine yellowish color and is distinguished by this property from all other kinds of flour employed for bakery purposes. Also the bread produced from this flour or from a mixture of flours containing the flour in question shows the just mentioned color. If bleaching substances, such, for instance, as ozone, hydric peroxid, or the like, are employed during the opening or disintegrating of the above named products, the flour has a somewhat lighter color; however, the tendency to get moldy or musty (which is chiefly caused by the flour taking up a rather large quantity of water during the baking operation) is greatly reduced.

A particularly well-tasting bread is obtained by mixing one part of rye malt dough with two parts of dough produced from flour made from grains prepared according to the before described novel method, adding some yeast and salt to the mixed dough and baking the whole for from 12 to 13 hours in a tight oven under the influence of heat and steam.

I claim:

1. The method of preparing grains for the manufacture of flour for bread and bakers' wares, consisting in subjecting said grains to the action of steam of less than approximately 100 degrees C. in order to preserve the diastase, substantially as described.

2. The method of preparing grains for the manufacture of flour for bread and bakers' wares, consisting in subjecting said grains to the action of steam of less than approximately 100 degrees C. in order to preserve the diastase, and then drying and squashing said grains, substantially as described.

In testimony whereof I affix my signature in presence of two witnesses.

ERNST SIMONS.

Witnesses:
FERDINAND KRAUSBAUER,
IRMA VOGEL.